US 8,108,657 B2

(12) United States Patent
Barraclough et al.

(10) Patent No.: US 8,108,657 B2
(45) Date of Patent: Jan. 31, 2012

(54) HANDLING FLOATING POINT OPERATIONS

(75) Inventors: Gavin Barraclough, Manchester (GB); James Richard Mulcahy, Manchester (GB); David James Rigby, Manchester (GB)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 12/039,375

(22) Filed: Feb. 28, 2008

(65) Prior Publication Data
US 2008/0244241 A1 Oct. 2, 2008

Related U.S. Application Data

(60) Provisional application No. 60/962,711, filed on Jul. 31, 2007.

(30) Foreign Application Priority Data

Mar. 30, 2007 (GB) .................................. 0706221.9

(51) Int. Cl.
*G06F 9/302* (2006.01)
*G06F 9/318* (2006.01)
(52) U.S. Cl. ......................................... 712/222; 712/209
(58) Field of Classification Search .................. 712/222, 712/209
See application file for complete search history.

(56) References Cited

U.S. PATENT DOCUMENTS

| 5,471,612 | A | * | 11/1995 | Schlafly | 715/210 |
| 5,634,118 | A | * | 5/1997 | Blomgren | 712/226 |
| 5,857,089 | A | * | 1/1999 | Goddard et al. | 712/222 |
| 5,903,772 | A | | 5/1999 | White et al. | |
| 6,018,798 | A | * | 1/2000 | Witt et al. | 712/220 |
| 6,061,782 | A | * | 5/2000 | Elliott et al. | 712/222 |
| 6,249,798 | B1 | * | 6/2001 | Golliver et al. | 708/490 |
| 2004/0215676 | A1 | | 10/2004 | Tang et al. | |
| 2004/0268324 | A1 | * | 12/2004 | Walker | 717/138 |
| 2006/0174232 | A1 | | 8/2006 | McCalla et al. | |

FOREIGN PATENT DOCUMENTS

WO  WO-00/22521  4/2000

(Continued)

OTHER PUBLICATIONS

Great Britain Search Report from Great Britain Patent Application No. GB0706221.9 mailed Jul. 20, 2007.

(Continued)

*Primary Examiner* — Daniel Pan
(74) *Attorney, Agent, or Firm* — Matthew B. Talpis; James L. Baudino

(57) ABSTRACT

A computing system capable of handling floating point operations during program code conversion is described, comprising a processor including a floating point unit and an integer unit. The computing system further comprises a translator unit arranged to receive subject code instructions including at least one instruction relating to a floating point operation and in response to generate corresponding target code for execution on said processor. To handle floating point operations a floating point status unit and a floating point control unit are provided within the translator. These units are cause the translator unit to generate either: target code for performing the floating point operations directly on the floating point unit; or target code for performing the floating point operations indirectly, for example using a combination of the integer unit and the floating point unit. In this way the efficiency of the computing system is improved.

29 Claims, 10 Drawing Sheets

FOREIGN PATENT DOCUMENTS

| | | |
|---|---|---|
| WO | WO-2004/095264 | 11/2004 |
| WO | WO-2004/097631 | 11/2004 |
| WO | WO-2005/003959 | 1/2005 |
| WO | WO-2005/008478 | 1/2005 |

OTHER PUBLICATIONS

International Search Report and Written Opinion for International Patent Application No. PCT/GB2008/050171 mailed Jun. 18, 2008.

* cited by examiner

HANDLING FLOATING POINT OPERATIONS

CROSS REFERENCE TO RELATED APPLICATIONS

This application claims benefit of GB Patent Application No. 0706221.9 filed Mar. 30, 2007 and U.S. Provisional Patent Application No. 60/962,711, filed Jul. 31, 2007.

FIELD OF THE INVENTION

The present invention relates generally to the field of computers and computer systems and, more particularly, to program code conversion methods and apparatus useful, for example, in code translators, emulators and accelerators which convert program code. More particularly, the present invention relates to a method and apparatus for conversion from binary code executable by a subject computing platform into target code executable instead by a target computing platform.

BACKGROUND OF THE INVENTION

The central processing unit (CPU) or processor lies at the heart of all modern computing systems. The processor executes instructions of a computer program and thus enables the computer perform useful work—in whatever form that work may take. CPUs are prevalent in all forms of digital devices in modern life and not just dedicated computing machines such as personal computers, laptops and PDAs. Modern microprocessors appear in everything from automobiles to cellular telephones to children's toys. In modern computing systems, additional hardware may be provided alongside or within the CPU to perform arithmetic operations as part of the computing system's work. Such hardware may comprise an integer unit (IU) for performing integer operations, and/or a floating point unit (FPU) for performing floating point operations.

A problem arises in that program code which is executable by one type of processor often cannot be executed in any other type of processor, because each type of processor has its own unique Instruction Set Architecture (ISA). Hence, program code conversion has evolved to automatically convert program code written for one type of processor into code which is executable by another type of processor, or to optimise old, inefficient code into a newer, faster version for the same type of processor. That is, in both embedded and non-embedded CPUs, there are predominant ISAs for which large bodies of software already exist that could be "accelerated" for performance or "translated" to other processors that present better cost/performance benefits. One also finds dominant CPU architectures that are locked in time to their ISA and cannot evolve in performance or market reach. This problem applies at all levels of the computing industry, from stand-alone pocket-sized computing devices right through to massive networks having tens or hundreds of powerful servers.

As background information in this field of program code conversion PCT publication WO2000/22521 entitled "Program Code Conversion", WO2004/095264 entitled "Method and Apparatus for Performing Interpreter Optimizations during Program Code Conversion", and WO2004/097631 entitled "Improved Architecture for Generating Intermediate Representations for Program Code Conversion", which are all incorporated herein by reference, disclose methods and apparatus to facilitate such program code conversion capabilities as may be employed in the example embodiments discussed herein.

During program code conversion, one particular problem area concerns the handling of numerical values expressed in floating point notation. Original program code (here called "subject code") that has been written according to a particular type of processor expects a particular type of execution environment. In particular, the subject code expects hardware support for operations on numerical values expressed in floating point notation to a particular level of numerical precision. This hardware support is provided by a subject FPU.

However, during program code conversion, subject code is converted into target code which is executed on a target computing platform. The target computing platform may comprise a FPU which supports operations on numerical values at a lower precision than those supported by the subject FPU. In this situation there is a fundamental hardware incompatibility between the subject computing platform and the target computing platform.

In response to the above-mentioned problem, PCT publication WO2005/003959 describes a mechanism for performing floating point operations on a target computing platform using a combination of the target FPU and integer hardware on the target computing platform. However, employing a mechanism which uses the integer hardware on the target computing system to provide the results of floating point operations is typically slow.

Therefore, during program code conversion two problems are encountered. Firstly, there is a problem that the hardware of the target computing platform may not provide floating point hardware support for the level of precision which is expected by the subject code. Secondly, there is the problem that using integer hardware of the target computing platform to provide the results of floating point operations at a precision expected by the subject code, and higher than supported by the target FPU is likely to be inefficient.

These and other problems of the prior art are addressed by the exemplary embodiments of the present invention as will be discussed in more detail below.

SUMMARY OF THE INVENTION

According to the present invention there is provided an apparatus and method as set forth in the appended claims. Other features of the invention will be apparent from the dependent claims, and the description which follows.

The following is a summary of various aspects and advantages realizable according to embodiments of the invention. It is provided as an introduction to assist those skilled in the art to more rapidly assimilate the detailed design discussion that ensues and does not and is not intended in any way to limit the scope of the claims that are appended hereto.

In particular, the inventors have developed methods directed at program code conversion, which are particularly useful in connection with a run-time translator that provides dynamic binary translation of subject code into target code.

In one exemplary aspect of the present invention there is provided a computing system comprising: a processor; a floating point unit and an integer unit within said processor; a translator unit arranged to receive subject code instructions including at least one instruction relating to a floating point operation, and in response to generate corresponding target code for execution on said processor; a floating point status unit within the translator arranged to generate floating point status information according to the received subject code instructions; and a floating point control unit within the translator unit arranged to receive the floating point status information from the floating point status unit, and in response to control the translator unit to generate either: target code for performing the floating point operation on the floating point unit; or target code for performing the floating point operation using a combination of the integer unit and the floating point unit.

In another exemplary aspect of the present invention there is provided a computing system comprising: a processor; a floating point unit and an integer unit within said processor; a translator unit arranged to receive subject code instructions including at least one instruction relating to a floating point operation, and in response to generate corresponding target code for execution on said processor; a floating point status unit within the translator arranged to generate floating point status information according to the received subject code instructions; and a floating point control unit within the translator unit arranged to receive the floating point status information from the floating point status unit, and in response to control the translator unit to generate either: target code for performing the floating point operation directly on the floating point unit; or target code for performing the floating point operation indirectly, using one or both of the integer unit and the floating point unit.

In another exemplary aspect of the present invention there is provided a decoder unit for use in a dynamic binary translator, the decoder unit comprising: a floating point status unit arranged to generate floating point status information according to floating point instructions in subject code instructions received by the decoder unit; and a floating point control unit arranged to receive the floating point status information from the floating point status, and in response to generate a control signal indicating a desired level of numerical precision for the output of the floating point instructions.

In another exemplary aspect of the present invention there is provided a method of handling floating point instructions in a computing system, comprising the computer-implemented steps of: receiving subject code instructions including at least one instruction relating to a floating point operation; generating floating point status information according to the received subject code instructions; and in response to the floating point status information generating either: target code for performing the floating point operations on a floating point unit of the computing system; or target code for performing the floating point operations using a combination of an integer unit of the computing system and the floating point unit of the computing system.

In another exemplary aspect of the present invention there is provided a method of handling floating point instructions in a computing system, comprising the computer-implemented steps of: receiving subject code instructions including at least one instruction relating to a floating point operation; generating floating point status information according to the received subject code instructions; and in response to the floating point status information generating either: target code for performing the floating point operations directly on a floating point unit of the computing system; or target code for performing the floating point operations indirectly, using a combination of an integer unit of the computing system and the floating point unit of the computing system.

The present invention also extends to a translator apparatus arranged to perform the embodiments of the invention discussed herein. Also, the present invention extends to computer-readable storage medium having recorded thereon instructions which may be implemented by a computer to perform any of the methods defined herein.

At least some embodiments of the invention may be constructed, partially or wholly, using dedicated special-purpose hardware. Terms such as 'component', 'module' or 'unit' used herein may include, but are not limited to, a hardware device, such as a Field Programmable Gate Array (FPGA) or Application Specific Integrated Circuit (ASIC), which performs certain tasks. Alternatively, elements of the invention may be configured to reside on an addressable storage medium and be configured to execute on one or more processors. Thus, functional elements of the invention may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Further, although the preferred embodiments have been described with reference to the components, modules and units discussed below, such functional elements may be combined into fewer elements or separated into additional elements.

BRIEF DESCRIPTION OF THE DRAWINGS

The accompanying drawings, which are incorporated in and constitute a part of the specification, illustrate presently preferred implementations and are described as follows.

DETAILED DESCRIPTION

The following description is provided to enable a person skilled in the art to make and use the invention and sets forth the best modes contemplated by the inventors of carrying out their invention. Various modifications, however, will remain readily apparent to those skilled in the art, since the general principles of the present invention have been defined herein specifically to provide an improved program code conversion method and apparatus.

Figure 1:
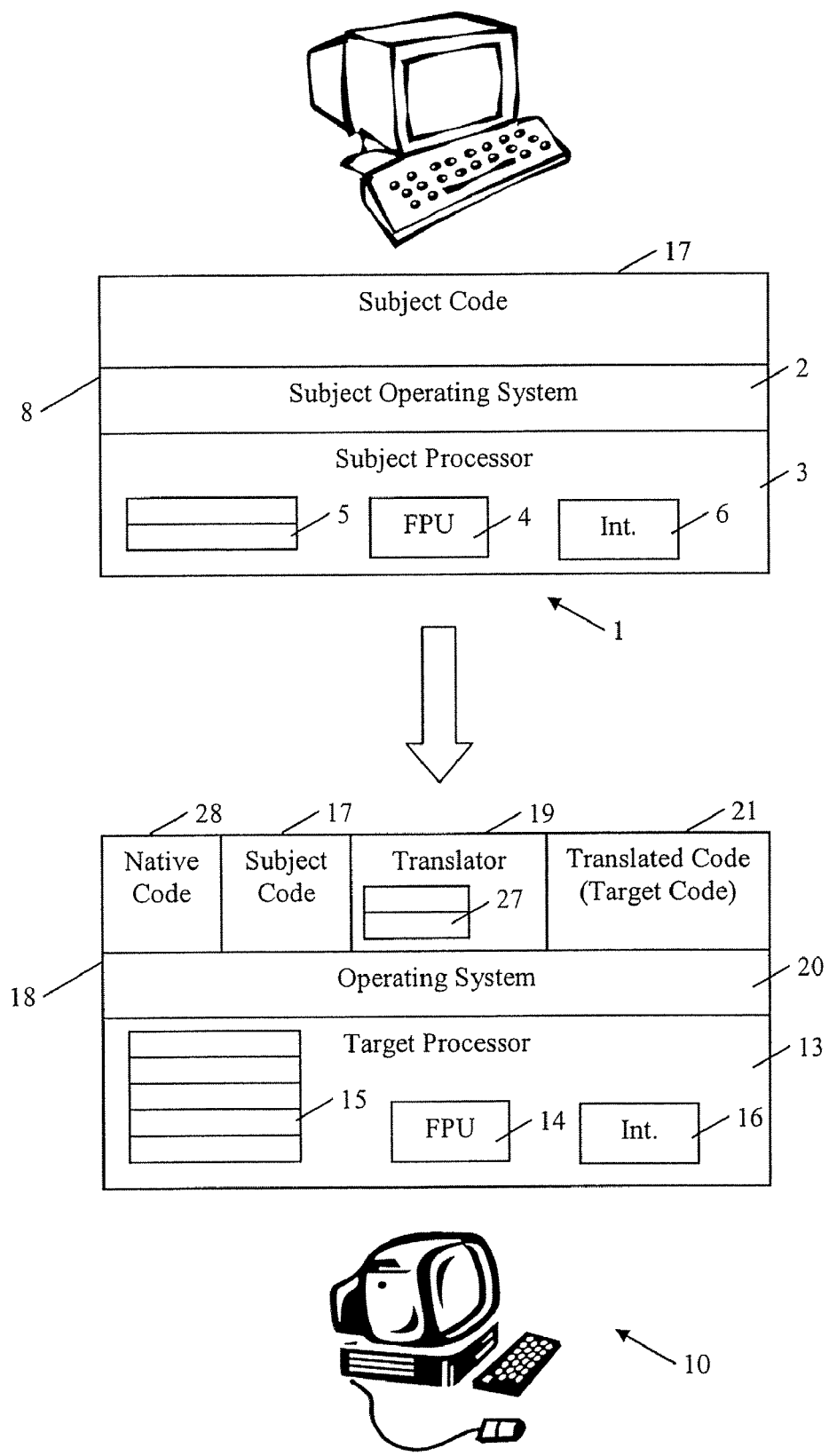
FIG. 1 is a block diagram illustrative of apparatus wherein embodiments of the invention find application.

FIG. 1 gives an overview of a system and environment where the example embodiments of the present invention may find application, in order to introduce the components, modules and units that will be discussed in more detail below. Referring to FIG. 1, a subject program 17 is intended to execute on a subject computing platform I having at least one subject processor 3. However, a target computing platform 10 is instead used to execute the subject program 17, through a translator unit 19 which performs program code conversion. The translator unit 19 performs code conversion from the subject code 17 to target code 21, such that the target code 21 is executable on the target computing platform 10.

As will be familiar to those skilled in the art, the subject processor 3 has a set of subject registers 5. A subject memory 8 holds, inter alia, the subject code 17 and a subject operating system 2. The subject computing platform 1 further includes a FPU 4 for computing floating point operations and an integer unit 6 for performing integer operations within the subject processor 3. The FPU 4 and the IU 6 may comprise any of a wide variety of types of hardware units, as known to those skilled in the art. Here, by way of example, the FPU 4 operates according to the IEEE 754 Standard entitled "IEEE Standard for Binary Floating Point Arithmetic (ANSI/IEEE Std 754-1985)".

This standard is used by many FPUs, and defines formats for representing floating point numbers, representations of special values (e.g. infinity), exceptions, rounding modes, and a set of floating point operations that will work identically on any conforming system. The IEEE 754 Standard further specifies the formats for representing floating point values with single-precision (32-bit), double-precision (64-bit), and double-extended precision (typically 80-bit).

Similarly, the example target computing platform 10 in FIG. 1 comprises at least one target processor 13 having a plurality of target registers 15, and a memory 18 to store a plurality of operational components including a target operating system 20, the subject code 17, the translator code 19, and the translated target code 21. The target computing platform 10 is typically a microprocessor-based computer or other suitable computer. The target computing platform 10 includes a FPU 14 for computing floating point operations and an IU 16 for performing integer operations.

In one embodiment, the translator code 19 is an emulator to translate subject code of a subject instruction set architecture (ISA) into translated target code of another ISA, with or without optimisations. In another embodiment, the translator unit 19 functions as an accelerator for translating subject code into target code, each of the same ISA, by performing program code optimisations.

The translator code 19 is suitably a compiled version of source code implementing the translator, and runs in conjunction with the operating system 20 on the target processor 13. It will be appreciated that the structure illustrated in FIG. 1 is exemplary only and that, for example, software, methods and processes according to embodiments of the invention may be implemented in code residing within or beneath an operating system 20. The subject code 17, translator code 19, operating system 20, and storage mechanisms of the memory 18 may be any of a wide variety of types, as known to those skilled in the art.

In the apparatus according to FIG. 1, program code conversion is performed dynamically, at run-time, to execute on the target architecture 10 while the target code 21 is running. That is, the translator unit 19 runs inline with the translated target code 21. Running the subject program 17 through the translator unit 19 involves two different types of code that execute in an interleaved manner: the translator code 19; and the target code 21. Hence, the target code 21 is generated by the translator code 19, throughout run-time, based on the stored subject code 17 of the program being translated.

In one embodiment, the translator unit 19 emulates relevant portions of the subject architecture 1 such as the subject processor 3 and particularly the subject registers 5, whilst actually executing the subject program 17 as target code 21 on the target processor 13. In the preferred embodiment, at least one global register store 27 is provided (also referred to as the subject register bank 27 or abstract register bank 27). In a multiprocessor environment, optionally more than one abstract register bank 27 is provided according to the architecture of the subject processor. A representation of a subject state is provided by components of the translator unit 19 and the target code 21. That is, the translator unit 19 stores the subject state in a variety of explicit programming language devices such as variables and/or objects. The translated target code 21, by comparison, provides subject processor state implicitly in the target registers 15 and in memory locations 18, which are manipulated by the target instructions of the target code 21. For example, a low-level representation of the global register store 27 is simply a region of allocated memory. In the source code of the translator unit 19, however, the global register store 27 is a data array or an object which can be accessed and manipulated at a higher level.

The term "basic block" will be familiar to those skilled in the art. A basic block is a section of code with exactly one entry point and exactly one exit point, which limits the block code to a single control path. For this reason, basic blocks are a useful fundamental unit of control flow. Suitably, the translator unit 19 divides the subject code 17 into a plurality of basic blocks, where each basic block is a sequential set of instructions between a first instruction at a single entry point and a last instruction at a single exit point (such as a jump, call or branch instruction). The translator unit 19 may select just one of these basic blocks (block mode) or select a group of the basic blocks (group block mode). A group block suitably comprises two or more basic blocks which are to be treated together as a single unit. Further, the translator may form iso-blocks representing the same basic block of subject code but under different entry conditions.

In the preferred embodiments, trees of Intermediate Representation (IR) are generated based on a subject instruction sequence, as part of the process of generating the target code 21 from the original subject program 17. IR trees are abstract representations of the expressions calculated and operations performed by the subject program. Later, the target code 21 is generated ("planted") based on the IR trees. Collections of IR nodes are actually directed acyclic graphs (DAGs), but are referred to colloquially as "trees".

As those skilled in the art may appreciate, in one embodiment the translator unit 19 is implemented using an object-oriented programming language such as C++. For example, an IR node is implemented as a C++ object, and references to other nodes are implemented as C++ references to the C++ objects corresponding to those other nodes. An IR tree is therefore implemented as a collection of IR node objects, containing various references to each other.

Further, in the embodiment under discussion, IR generation uses a set of register definitions which correspond to specific features of the subject architecture upon which the subject program 17 is intended to run. For example, there is a unique register definition for each physical register on the subject architecture (i.e., the subject registers 5 of FIG. 1). As such, register definitions in the translator may be implemented as a C++ object which contains a reference to an IR node object (i.e., an IR tree). The aggregate of all IR trees referred to by the set of register definitions is referred to as the working IR forest ("forest" because it contains multiple abstract register roots, each of which refers to an IR tree). These IR trees and other processes suitably form part of the translator unit 19.

FIG. 1 further shows native code 28 in the memory 18 of the target architecture 10. There is a distinction between the target code 21, which results from the run-time translation of the subject code 17, and the native code 28, which is written or compiled directly for the target architecture. In some embodiments, a native binding is implemented by the translator unit 19 when it detects that the subject program's flow of control enters a section of subject code 17, such as a subject library, for which a native version of the subject code exists. Rather than translating the subject code, the translator unit 19 instead causes the equivalent native code 28 to be executed on the target processor 13. In example embodiments, the translator unit 19 binds generated target code 21 to the native code 28 using a defined interface, such as native code or target code call stubs, as discussed in more detail in published PCT application WO2005/008478, the disclosure of which is incorporated herein by reference.

Figure 2:
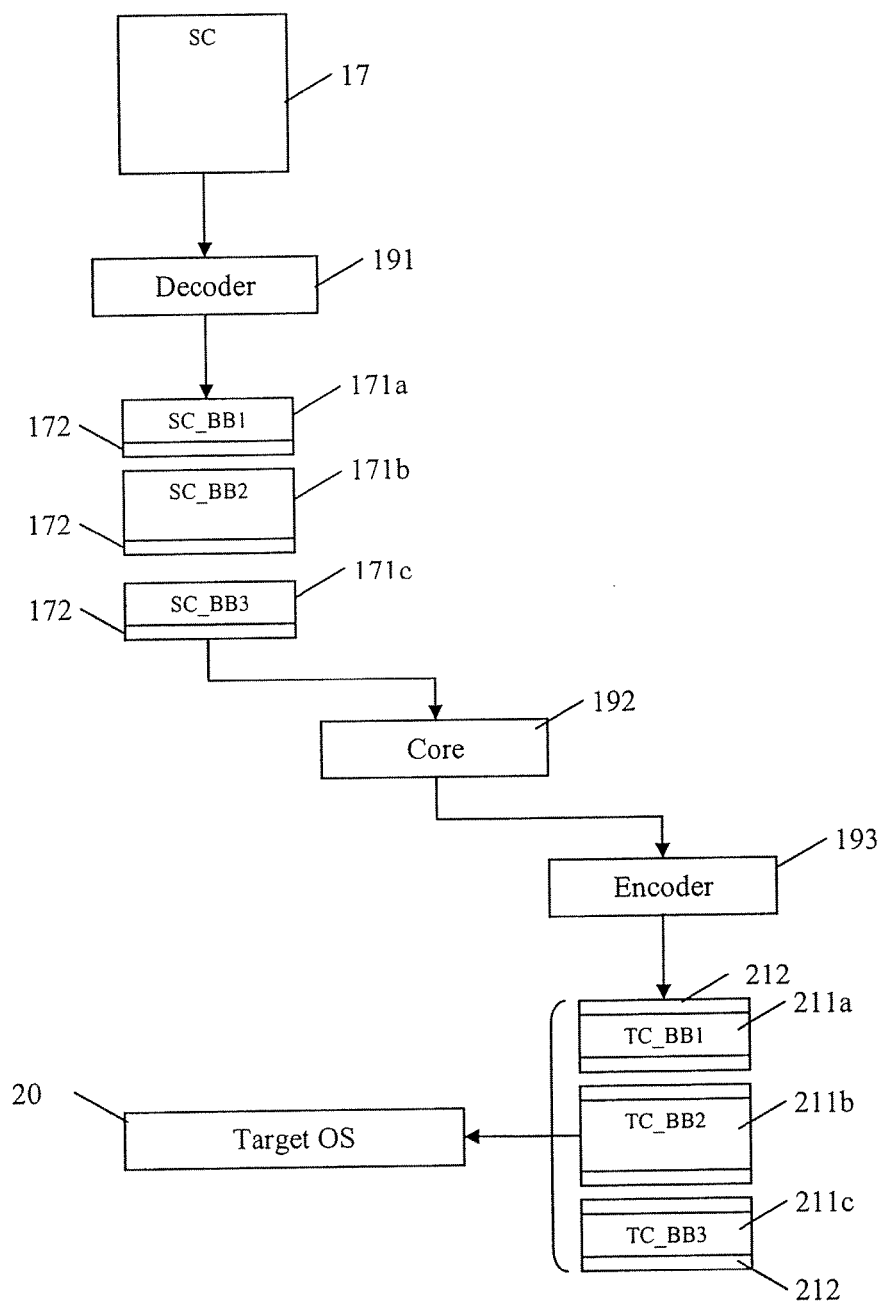
FIG. 2 is a schematic overview of a program code conversion process as employed by embodiments of the present invention.

FIG. 2 illustrates the translator unit 19 in more detail when running on the target computing platform 10. As discussed above, the front end of the translator unit 19 includes a decoder unit 191 which decodes a currently needed section of the subject program 17 to provide a plurality of subject code blocks 171a, 171b, 171c (which usually each contain one basic block of subject code), and may also provide decoder information 172 in relation to each subject block and the subject instructions contained therein which will assist the later operations of the translator unit 19. In some embodiments, an IR unit in the core 192 of the translator unit 19 produces an intermediate representation (IR) from the decoded subject instructions, and optimisations are opportunely performed in relation to the intermediate representation. An encoder 193 as part of the back end of the translator unit 19 generates (plants) target code 21 executable by the target processor 13. In this simplistic example, three target code blocks 211a-211c are generated to perform work on the target platform 10 equivalent to executing the subject code blocks 171a-171c on the subject platform 1. Also, the encoder 193 may generate control code 212 for some or all of the target code blocks 211a-211c which performs functions such as setting the environment in which the target block will operate and passing control back to the translator unit 19 where appropriate. The translator unit 19 is thus arranged to interface the execution of the target code 21 with the target operating system 20.

Figure 3:
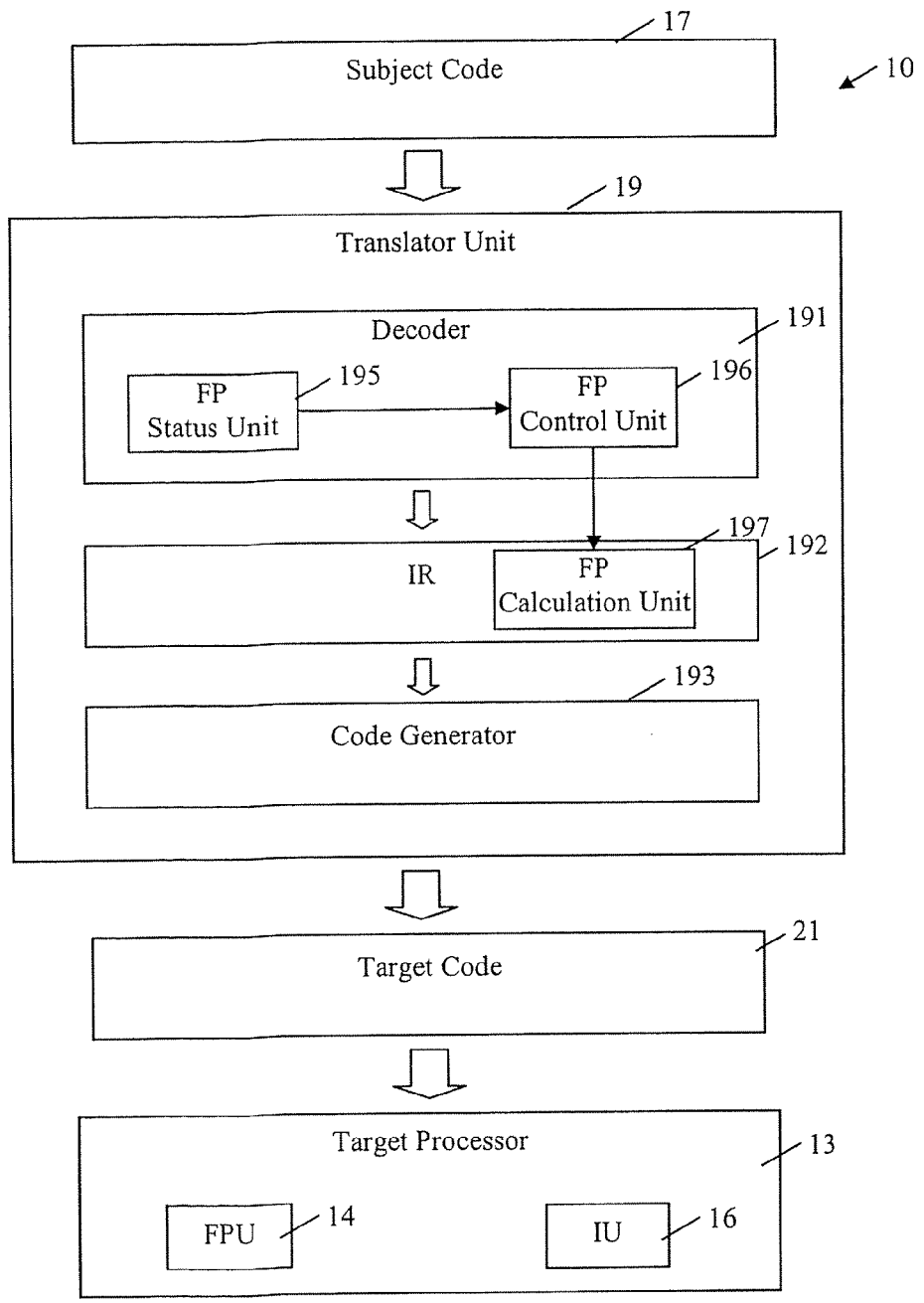
FIG. 3 shows a block diagram illustrative of a computer system according to an exemplary embodiment of the invention.

FIG. 3 shows a block diagram illustrative of a computer system 10 according to an exemplary embodiment of the invention. In FIG. 3, the subject code 17 expects hardware support for operations on numerical values expressed in floating point notation to a particular level of numerical precision. However, in the computer system 10 of FIG. 3 the subject code 17 is converted into target code 21 by a translator 19. The target code 21 is executed by a target processor 13. The target processor 13 comprises an IU 16, and a FPU 14 which supports floating point operations on numerical values at a lower precision than that expected by the subject code 17. In this situation there is a fundamental incompatibility between the subject code and the hardware of the target processor 13.

The term high precision refers to a level of numerical precision which is higher than that provided for by the hardware of the FPU 14 of the target processor 13. Low precision refers to a level of numerical precision which is lower than or equal to that provided for by the hardware of the FPU 14 of the target processor 13. High precision can be considered to be above-target precision, i.e. numerically more accurate than the precision natively catered for by the target processor 13. High precision issues arise when more data bits are present in the hardware expected by the subject code 17 than are present in the target FPU 14.

Within the decoder 191 of the translator unit 19 is a floating point status unit 195. The floating point status unit is arranged to determine floating point status information. The floating point status information is determined according to instructions in the subject code 17 received by the translator unit 19. The floating point status information indicates whether the FPU 14 is to be used directly to provide the result of floating point operations in the subject code 17, or whether the results are to be provided indirectly, for example by using the IU 16, either alone or in combination with the FPU 14.

A floating point control unit 196 is shown within the translator 19. The floating point control unit 196 receives the floating point status information from the floating point status unit 195. The floating point control unit 196 checks received subject code instructions for floating point operations, and when a floating point operation is identified checks the floating point status information. The floating point control unit 196 then controls the translator unit 19 to generate target code 21.

In this embodiment the floating point control unit sends a control signal to a floating point calculation unit 197 in the core 192. The floating point calculation unit 197 generates and optimises an appropriate intermediate representation according to the control signal received from the floating point control unit 196. From this, the code generator 193 generates corresponding target code 21. The target code 21 contains either: code which when executed on the target processor 13 directly performs the floating point operations required by the subject code 17 on the FPU 14; or contains code which when executed on the target processor 13 generates the result of the floating point operations required by the subject code 17 indirectly, using the IU 16 and/or the FPU 14. In another embodiment the floating point calculation unit 197 cause the code generator 193 to plant target code 21 to perform the floating point operations without the need for specific IR to be generated, for example by making use of target code which is available to the translator unit 19 a priori.

To put the embodiment shown in FIG. 3 into context, the subject code 17 may for example comprise Intel x86 instructions, including there-within instructions from the x87 instruction subset to be performed on an x87 FPU. An x87 FPU provides an output accurate to one of 32, 64 or 80-bit precision, according to a value set in a control register. If the target processor 13 shown in FIG. 3 is a PowerPC, the output of the FPU 14 is provided at either 32 or 64-bit precision. 80-bit extended precision operations, and operations at higher precisions are not supported by the FPU of a PowerPC.

To allow the PowerPC to generate results at 80-bit precision the FPU 14 can be used in combination with the IU 16. However, target code 21 generated by the translator unit 19 to evaluate the result of an 80-bit floating point operation using the FPU 14 in combination with the IU 16 is slow. It is therefore desirable to improve efficiency in the target processor by reducing the amount of work assigned to the IU, and to make best use of the FPU of the target processor.

The floating point status unit 195, the floating point control unit 196 and the floating point calculation unit 197 and their respective functions are now described in more detail. The floating point status unit 195 is determines floating point status information according to instructions in the subject code 17 received by the translator unit 19. The floating point status unit 195 identifies instructions in the subject code which provide data to the subject FPU, and determines the precision of such data. In particular, data provided as source operands for the subject FPU are used to set the floating point status information.

When an instruction which loads data into the subject FPU is encountered in the subject code 17, the floating point status unit 195 determines according to the precision of the data and the precision of the FPU 14 whether the FPU 14 is used to directly provide the result of floating point operations in the subject code 17, or whether the IU 16 should be used alone or in combination with the FPU 14 to indirectly provide the result. The floating point status information unit 195 then sets the floating point status information accordingly.

The terms directly and indirectly used herein in relation to the way in which target code makes use of the target FPU 14 and IU 16 to generate the results of floating point operations of the subject code is now explained. Using the target FPU 14 directly is using the target FPU hardware at a level of precision supported by the target FPU. The target FPU, when presented with the source operands from the subject code which are at a level of numerical precision that it can support, can make direct use of its hardware to use the source operands to generate the result of the floating point operation. Using the target FPU 14 and/or IU 16 indirectly is using the FPU 14 and/or IU 16 to perform intermediate calculations on the source operands as part of work towards generating the output of the floating point operations specified in the subject code. Indirect use of the target FPU 14 and/or IU 16 allows low precision hardware to generate high precision results, but at the expense of performing a suitable set of intermediate calculations. In example embodiments, the indirect use of the target FPU 14 and/or IU 16 to generate the results of floating point operations in the subject code to a level of precision which is higher than the precision provided for by the target hardware involves the use of a floating point emulation algorithm. A suitable emulation algorithm comprises the SoftFloat algorithm. Suitable emulation algorithms will typically use the target IU 16 in the indirect calculation of the results of high precision floating point operations, but may in addition use the target FPU 16. In some embodiments it is however possible for just the target FPU 16 to be used in the indirect evaluation of the result of a specified subject floating point operation at high precision.

The floating point control unit 196 receives the floating point status information from the floating point status unit 195, and checks received subject code instructions for floating point operations. The floating point control unit 196 identifies floating point operations in the subject code 17, and notes the floating point status information. The floating point control unit 196 passes a control signal to the floating point calculation unit 197. In response the floating point calculation unit 197 generates and optimises an appropriate intermediate representation. From this, the code generator 193 generates corresponding target code 21 which either employs the FPU 14 to provide the result of floating point operations in the subject code 17 directly at the required level of precision, or employs the IU 16 and/or the FPU 14 indirectly to provide the result.

In one embodiment the floating point status unit 195 is arranged to generate a flag associated with each piece of data which is usable a source operand for a floating point operation. For example, source operands for floating point operations may be loaded into a FPU from memory or by subject instructions which directly set register contents to a predetermined mathematical or other constant, such as e.g. pi. The flags comprise the floating point status information, and indicate the precision of the data. The floating point status unit 195 is arranged to identify and distinguish load instructions and other instructions in the subject code 17 which specify the precision of the associated data.

The floating point control unit 196 identifies the operands for a floating point operation in received subject code and checks the flags received from the floating point status unit 195. The floating point control unit 196 controls the floating point calculation unit 197 to ensure that the hardware in the target processor is used correctly to generate the result of the floating point operations. The floating point status unit 195 is suitably arranged to generate a flag indicating the precision of the result of the floating point operation, which is then also used by the floating point control unit 196 and floating point calculation unit 197 in the generation of suitable target code. In one example embodiment, the results of operations performed on high precision source operands are determined to be themselves high precision, and flagged themselves as high precision data requiring subsequent operations on that result to also be performed at high precision.

Figure 4:
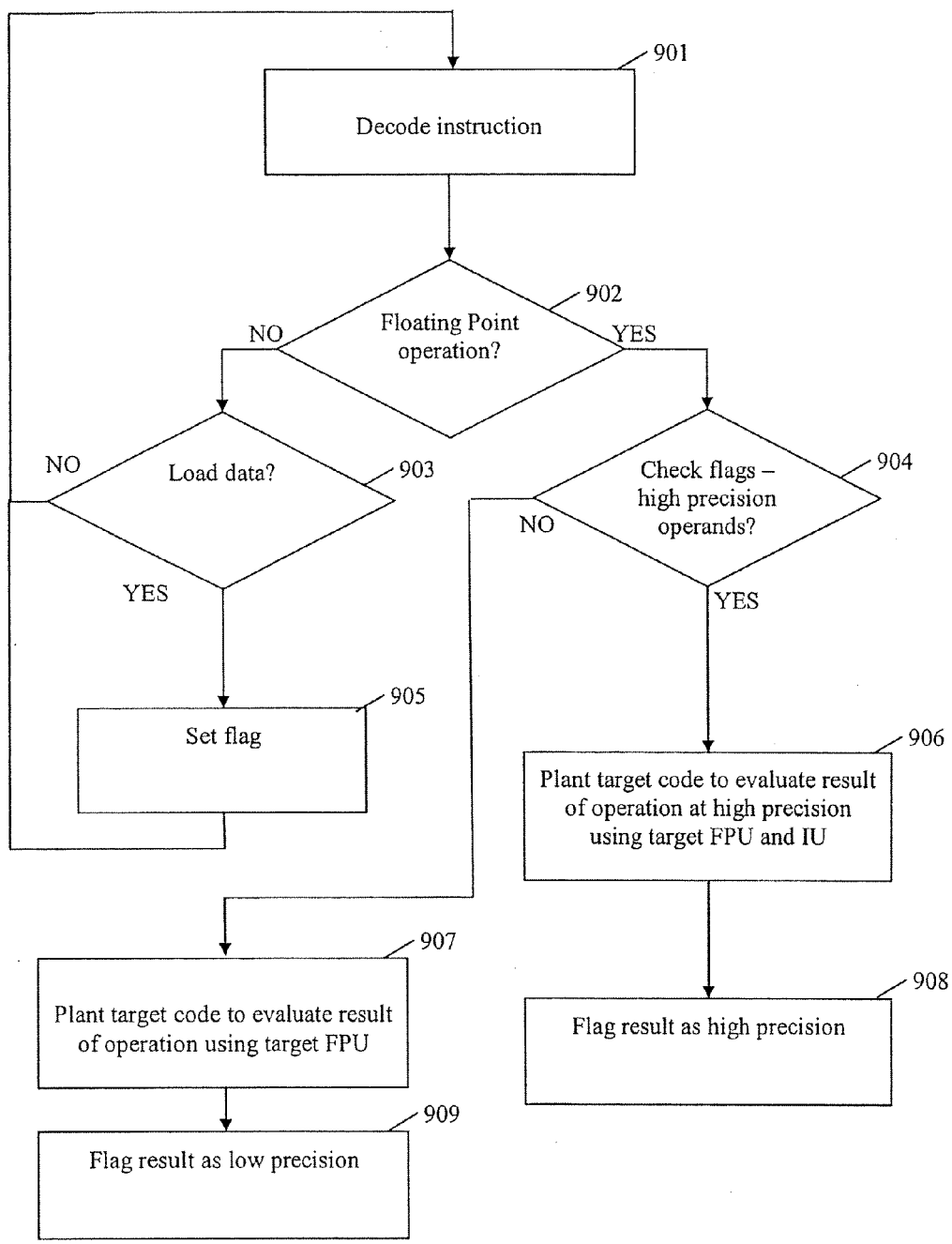
FIG. 4 shows a flow diagram illustrating the steps performed by the floating point status unit, the floating point control unit and the floating point calculation unit in the embodiment of FIG. 3.

FIG. 4 shows a flow diagram illustrating the steps performed by the floating point status unit, the floating point control unit and the floating point calculation unit 197 in the embodiment described above. At step 901 a subject instruction is decoded, and then at step 902 analysed by the floating point control unit 196 to determine to determine whether it is a floating point operation. If it is, the right hand branch is followed to step 904. At this step, the flags of the operands are examined.

As is described in more detail below, when data is loaded into a data structure of the subject FPU, or otherwise becomes a subject floating point source operand, a flag is set by the floating point status unit 195 according to the precision of the data.

If at step 904 the flags of one or more of the operands indicate high precision, the floating point control unit 196 causes the floating point calculation unit 197 to generate IR which will lead to target code being generated by the encoder 193 in which the operation being performed on the target FPU 14 in combination with the target IU 16 (step 906). Then at step 908 the floating point calculation unit 197 sets a flag for the result of the floating point operation to indicate high precision. If at step 904 the floating point control unit determines that flags of the operands indicate low precision then the floating point control unit 196 causes the floating point calculation unit 197 to generate IR which will lead to target code being generated by the encoder 193 in which the operation in question is performed on the target FPU 14, without the involvement of the target IU 16 (step 907). Thereafter the flow continues to step 909 where the floating point status unit 195 sets a flag for the result of the floating point operation to indicate low precision.

If at step 902 the next instruction is determined by the floating point control unit not to be a floating point operation, the left hand branch is followed to step 903. At this step the instruction is analysed by the floating point status unit 195 to determine whether it is a load of data. If it is not then the work of the floating point control unit 196 and the floating point status unit 195 is complete until the next subject code instruction is decoded at step 901. If at step 903 the floating point status unit 195 determines that the instruction is load, then the floating point status unit 195 sets a flag for the loaded data according to the precision specified by the load instruction, and work of the floating point control unit 196 and the floating point status unit 195 is complete unit the next subject code instruction is decoded at step 901.

The embodiment described above allows accurate tracking of data precision using the flags generated by the floating point status unit 195. However, the generation of flags as described introduces an administrative overhead.

As an alternative to the embodiment above which uses flags associated with each piece of loaded data in the generation of floating point status information, a second embodiment of the invention takes advantage of characteristics of the FPU 4 expected by the subject code 17, in particular characteristics of a data structure associated with the FPU 4 are used. In the second embodiment the floating point status unit 195 generates floating point status information without adding a significant administrative burden. In the second embodiment the floating point status unit generates floating point status information on a per basic block basis. The floating point status unit generates floating point status information in accordance with the characteristics of a data structure associated with the FPU 4 at the start of a basic block of target code. Basic blocks of target code are then generated which either use the target FPU only to directly perform the floating point operations required by the subject code 17 for the whole of the basic block, or which use indirect calculation in the target FPU 14 and/or the target IU 16 for the whole of the basic block.

Figure 5:
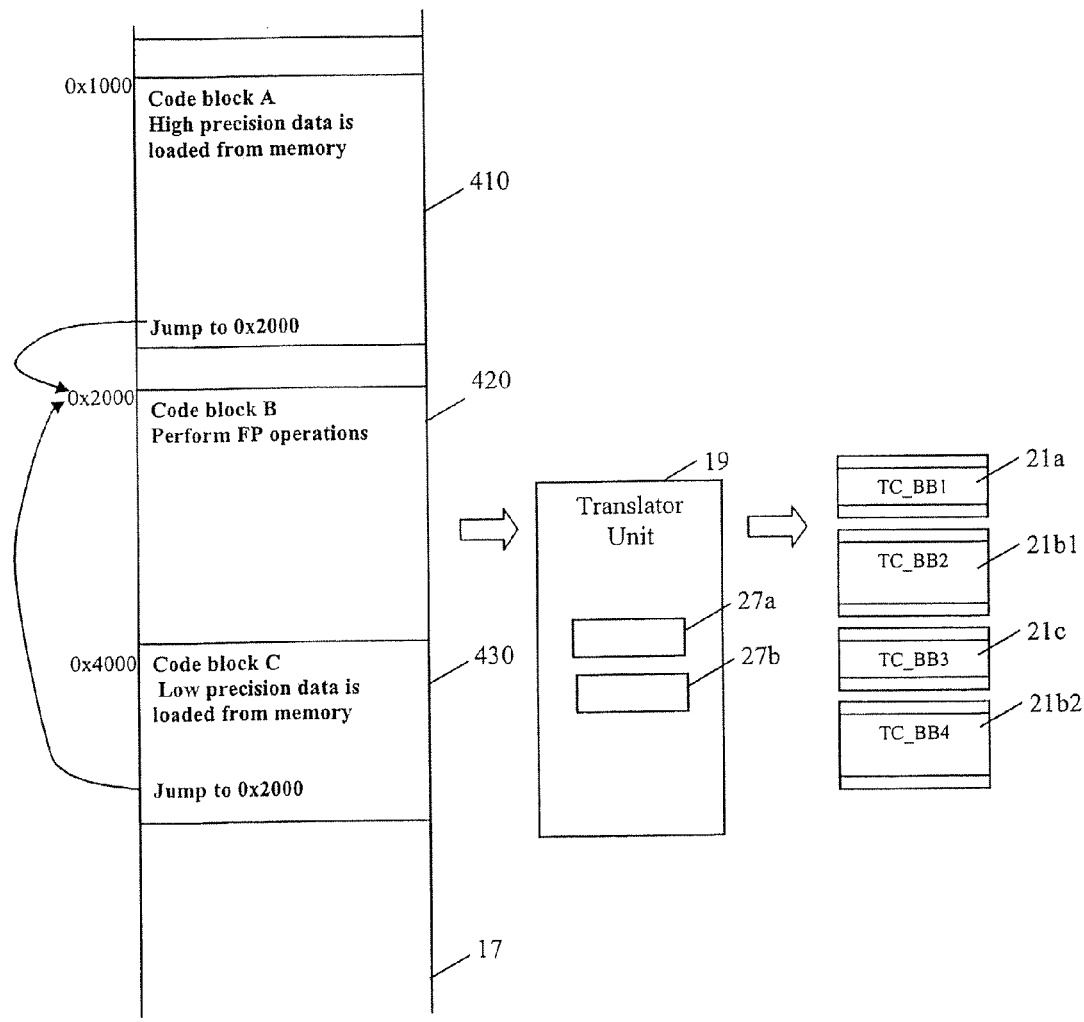
FIG. 5 shows an example piece of subject code, a translator unit as shown in the embodiment of FIG. 3, and four target code basic blocks generated by the translator unit.

FIG. 5 illustrates an example piece of subject code 17 such as is stored in a memory 18 of a target processor 13 prior to conversion into target code 21. Also shown in FIG. 5 are four target code basic blocks 21a, 21b1, 21c and 21b2 and a translator unit 19. The target code basic blocks are generated by the translator unit 19 when the subject code 17 is converted into target code 21. The target code basic blocks 21b1 and 21b2 are iso-blocks, representing the same basic block of subject code but under different entry conditions. Also shown in FIG. 5 as storage locations 27a and 27b accessible to the translator, and which form a representation of a subject data structure associated with a subject FPU 4.

The entry conditions which differ between basic blocks 21b1 and 21b2 relate to the precision of the data within the storage 27a associated with the subject FPU 4. The entry conditions describe which of the data within the storage 27a represent high precision data. At the beginning of translation of a block this data is loaded into the floating point status unit 195 as the floating point status information. As instructions are translated by the translator unit 19 the floating point status unit 195 updates this information. When an instruction that loads high precision data into the FPU is translated into the block by the decoder 191, the floating point status information is updated to reflect this. Upon translating a floating point instruction in the received subject code, the floating point control unit 196 inspects the floating point status information. If the operands to the instruction are low precision, IR is generated by the floating point calculating unit 197 under the control of the floating point control unit 196 to perform the operation at low precision, and the floating point status is updated to track that the result is in low precision. Where operands to the instruction are high precision, IR is generated by the floating point calculating unit 197 under the control of the floating point control unit 196 to perform the operation at high precision, and the floating point status information is updated to track that the result is a high precision value. At the end of the block the floating point status information is copied back out of the floating point status unit 195; this data will form part of the entry condition for a subsequently executed block.

The establishment of precision-specialised basic blocks/iso-blocks facilitates block optimisation in the IR.

Referring again to FIG. 5, the subject code 17 includes a block B (420) starting at a memory address corresponding to subject code program counter 0x2000 and includes floating point operations. However, as the translator decodes the block B it is not known a priori what instructions this block will contain. In particular, it is not known whether the block will load any data into a data structure associated with the FPU 4, whether the block will contain any floating point operations, and what level of precision will be specified for the result of any such floating point operations.

Block B is reached from either a block A (410) starting at 0x1000 or from block C (430) starting at 0x4000. At the end of block A, high precision data is loaded into the representation of the data structure associated with the FPU 4. When the code block B is reached from the block A, a basic block 21b1 specialised for entry conditions of high precision data is generated. Under these entry conditions the FPU 14 of the target processor 13 and/or the IU 16 of the target processor 13 are used indirectly to evaluate the result of the floating point operations specified in block B.

At the end of block C, low precision data is loaded in the representation of the data structure associated with the subject FPU 4. When the subject code block B is reached from the end of block C a basic block specialised for entry conditions of low precision data is generated. Under these entry conditions the FPU 14 of the target processor 13 is used directly to evaluate the result of the floating point operations specified in block B.

The subject code 17 may for example comprise Intel x86 instructions, including there-within instructions from the x87 instruction subset to be performed on an x87 FPU. An x87 FPU employs a stack data structure to hold source operands for the FPU, and to hold the output of the FPU. The x87 stores source operands for the FPU and the output of the FPU in a register stack. The x87 FPU register stack comprises 8 registers, each of which is 80-bits wide. Data is pushed onto the stack from memory, and popped off the stack back to memory. Instructions relating to floating point operations will generally will pop the two source operands off the top of the stack, act on them, and push the result of the FPU operations back on to the top of the stack.

By monitoring the content of a representation of the subject FPU stack, the floating point status unit 195 can determine the likely precision required for the results of FPU operations in a block, as that block is commenced. Monitoring a representation of the subject FPU stack provides a particularly convenient way of generating floating point status information.

The translator unit 19 is arranged to maintain a representation of the subject FPU register stack as part of a subject register bank 27 as described in relation to FIG. 1. This representation includes a representation of the data locations in the subject FPU register stack, and a representation of the subject FPU stack pointer, which are shown for example as storage locations 27a and 27b in FIG. 5.

An example in which the subject code 17 comprises 80-bit instructions from the x87 instruction subset, and the FPU of the target processor is accurate to only 64-bit precision is now described. When at the start of a basic block the representation of the subject register stack contains only 64-bit data, the floating point status unit 195 sets the floating point status information so that the FPU 14 of the target processor 13 is used to perform floating point operations on the data in the block. The subject floating point status unit 195 monitors subject code instructions in the block, and if it identifies an instruction which pushes high precision data onto the subject FPU stack, it performs two operations on the floating point status information. Firstly, the floating point status information is set so that the floating point control unit 196 ends the basic block. Secondly, the floating point status information is set so that the floating point control unit 196 establishes a new basic block.

In response to a change in the floating point status information as described above, the floating point control unit 196 causes target code to be generated to reformat any 64-bit data present in the representation of the subject FPU stack 27a so that it is presented according to the conventions for 80-bit data. This process is referred to as up-conversion. The floating point control unit 196 causes target code to be generated in which the FPU 14 and/or IU 16 are used indirectly to perform floating point operations on the data present in the representation of the subject FPU stack 27a within the new basic block.

By monitoring the representation of the subject FPU stack pointer 27b, the floating point status unit 195 determines when the representation of the subject FPU stack 27a is empty. When this occurs, the floating point status unit 195 sets the floating point status information to indicate that all operations on any previously loaded high precision data are completed. A target code block is then generated under the control of the floating point control unit 196 which uses only the target FPU 14 directly to generate the results of floating point operations in the subject code 17.

Monitoring the precision associated with instructions which provide source operands for the FPU, such as subject code FPU load instructions, and monitoring the representation of the subject FPU stack pointer 27b to determine whether any high precision instructions have been performed since the last time the stack pointer 27b indicated the stack 27a was empty gives the floating point status unit 195 information to efficiently set the floating point status information. Using the floating point status information enables that target code to be selectively generated to employ the FPU 14 of the target processor 13 directly, or to use the FPU 14 and/or IU 16 of the target processor indirectly, to generate the result of floating point operations specified in the subject code 17. This embodiment involves only a minimal overhead in monitoring data, and provides a convenient way of generating floating point status information for use in generation of a translation of received subject code.

Figure 6:
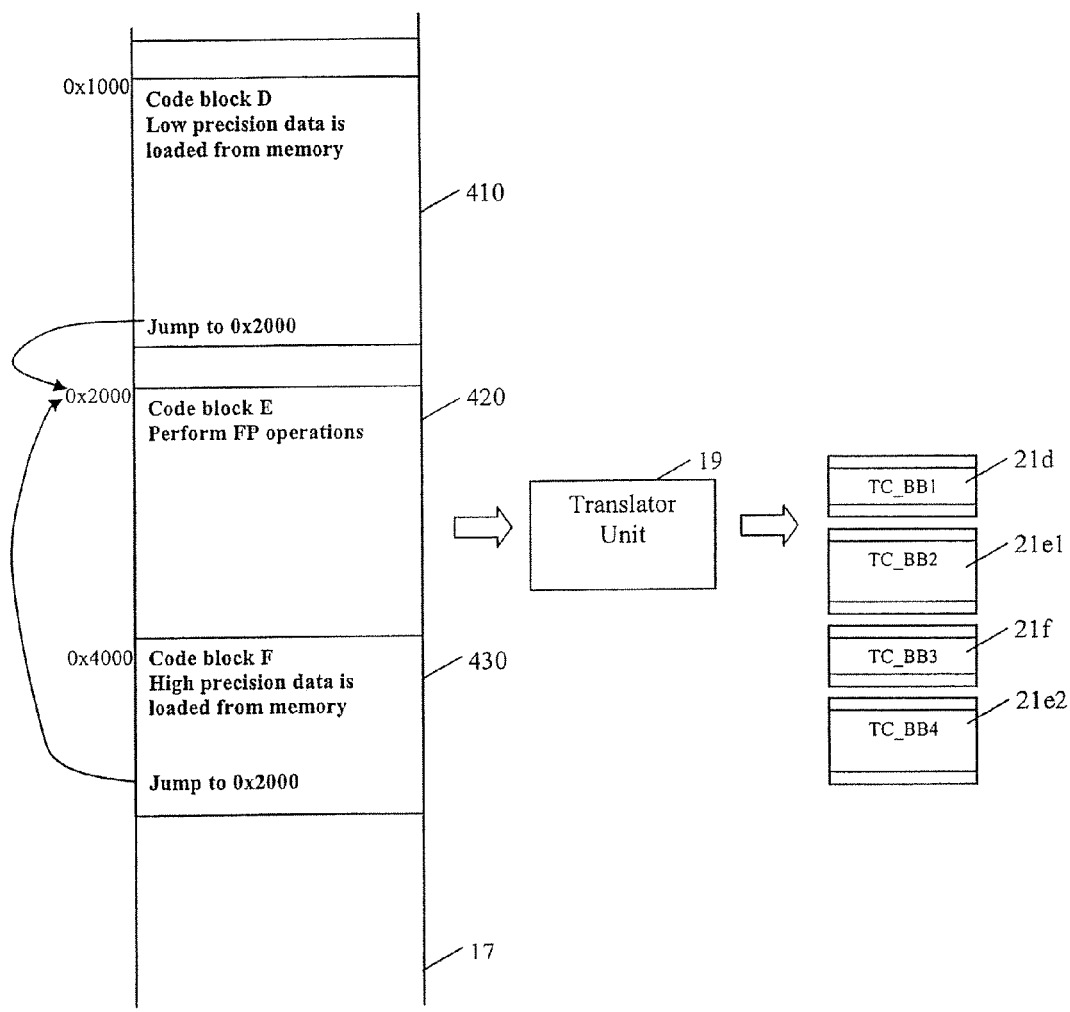
FIG. 6 shows a further example piece of subject code, a translator unit as shown in the embodiment of FIG. 3, and four target code basic blocks generated by the translator unit.

FIG. 6 illustrates an example piece of subject code 17 such as is stored in a memory 18 of a target processor 13 prior to conversion into target code 21. The subject code 17 is made up of blocks D, E and F labelled 410, 420 and 430 respectively. Also shown in FIG. 6 are four target code basic blocks 21d, 21e1, 21f and 21e2 and a translator unit 19. The target code basic blocks are generated by the translator unit 19 when the subject code 17 is converted into target code 21. The target code basic blocks 21e1 and 21f2 are iso-blocks, representing the same basic block of subject code but under different entry conditions. FIG. 6 illustrates a situation similar to that of FIG. 5, but in which the generated target code blocks 21e1 and 21f1 represent iso-blocks generated with low precision and high precision entry conditions respectively.

Figure 7:
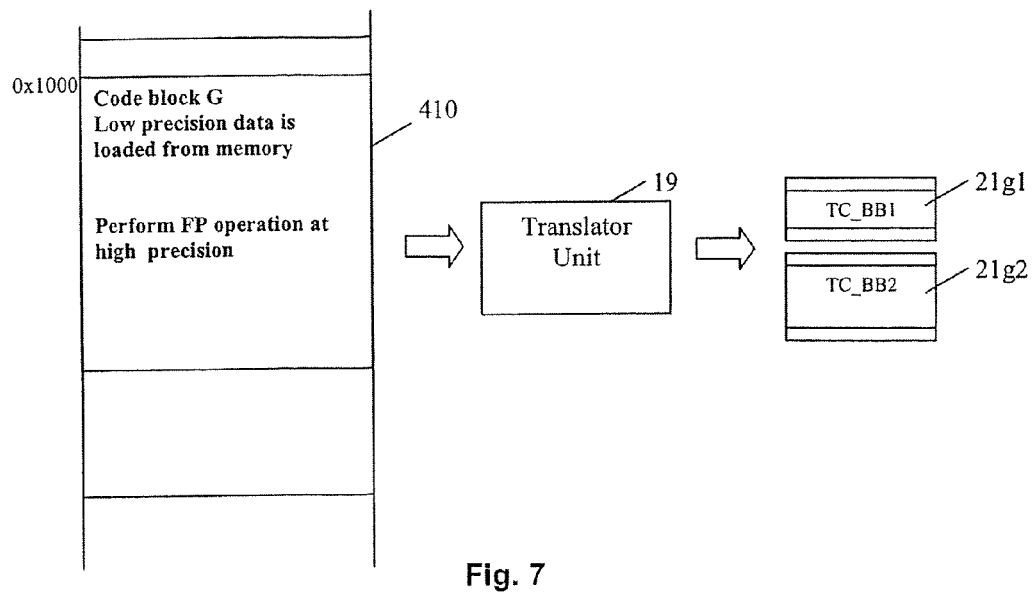
FIG. 7 shows a second further example piece of subject code, a translator unit as shown in the embodiment of FIG. 3, and two target code basic blocks generated by the translator unit.

FIG. 7 illustrates the process of ending a block and starting a new block in response to an operation which requires higher precision than that indicated by the floating point status information when the block was commenced. The subject code block G (410) was commenced with low precision entry conditions. The floating point status unit 195 within the translator unit 19 identifies an instruction in the subject code 17 of the block G which takes operands of higher precision, or which requires an output of higher precision than that indicated by the floating point status information when the block was commenced. The current basic block 21g1 ends. A new basic block 21g2 is established under high precision entry conditions, without having included a translation of the instruction that requiring high precision.

Figure 8:
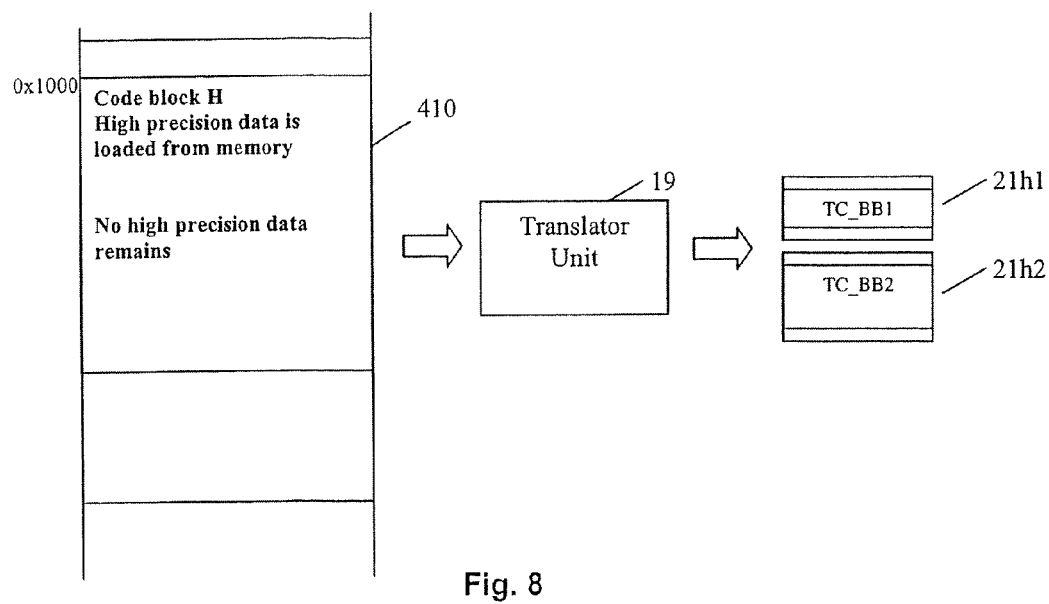
FIG. 8 shows a third further example piece of subject code, a translator unit as shown in the embodiment of FIG. 3, and two target code basic blocks generated by the translator unit.

FIG. 8 illustrates the process of ending a block and starting a new block in response to an operation which requires lower precision than that indicated by the floating point status information when the block was commenced. The subject code block H (410) was commenced with high precision entry conditions. The floating point status unit 195 within the translator 19 identifies that at some point in time none of the data in the data structure associated with the subject FPU is high precision. The current basic block 21h1 ends. A new basic block 21h2 is established under low precision entry conditions.

In some circumstances, the floating point status unit 195 and floating point control unit 196 described above will operate in response to the received subject code instructions to generate basic blocks of target code whose sole function is to perform up-conversion of data stored in the representation of the subject FPU stack 27a, 27b.

Figure 9:
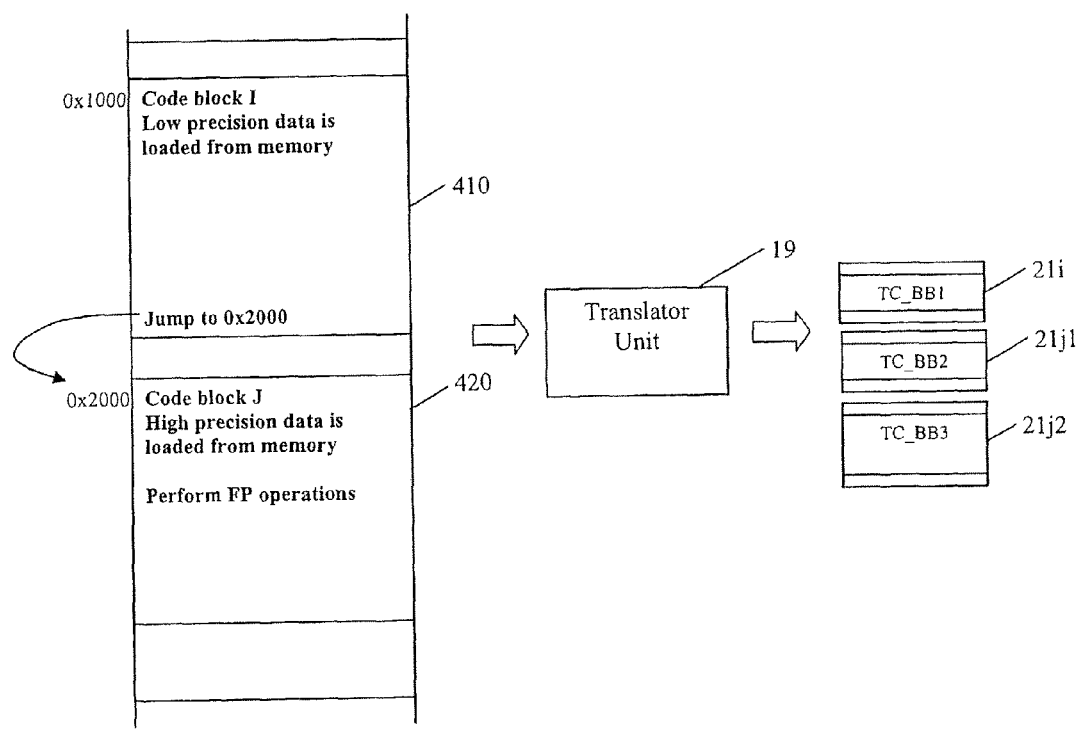
FIG. 9 shows a fourth further example piece of subject code, a translator unit as shown in the embodiment of FIG. 3, and three target code basic blocks generated by the translator unit.

FIG. 9 shows a subject code block I (410) which is established under low precision conditions. Low precision conditions persist unit the block is ended in response the illustrated Jump instruction. However, when Jump instruction is carried out, the next instruction, i.e. the first instruction in block J (420) relates to high precision data. When the target code block 21j1 is established the first instruction in the block has not been decoded by the translator unit 19. In this scenario a low precision block 21j1 is established, data loaded in the subject code representation of the FPU stack 27a is up-converted, and then a high precision block 21j2 is established.

Figure 10:
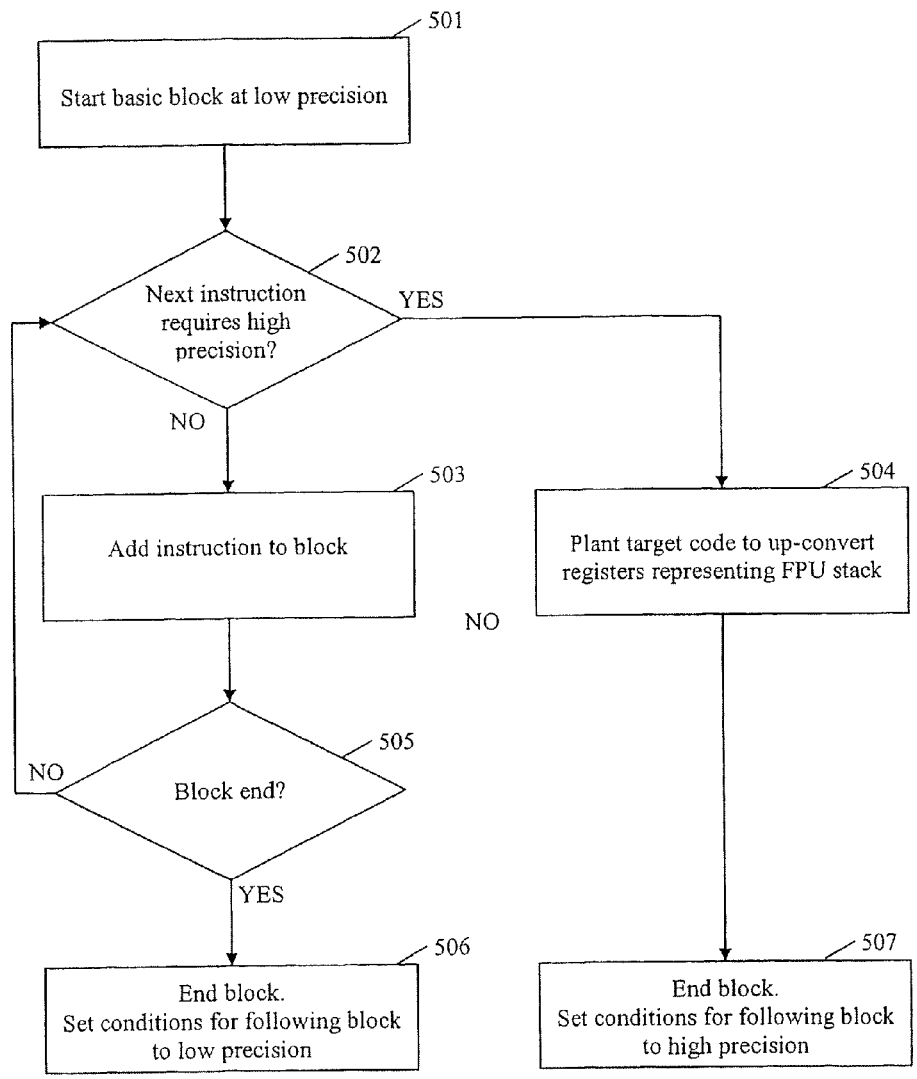
FIG. 10 shows a flow diagram illustrating the steps performed by the floating point status unit, the floating point control unit and the floating point calculation unit in the embodiment of FIG. 3 when generating a basic block which is entered under low precision entry conditions, according to an exemplary embodiment of the present invention.

FIG. 10 shows a flow diagram illustrating the generation of a basic block which is entered under low precision entry conditions. These entry conditions may be assumed as a default condition for a first basic block in a piece of subject code 17 to be converted, as it is desirable to use only the FPU 14 of the target processor 13 in evaluating the results of subject code floating point operations, if possible. Setting the required precision is performed by the floating point status unit 195. The floating point status unit 195 establishes floating point status information, as described above, preferably indicating the precision of the block is the highest level of precision that is supported by the FPU 14 of the target processor 13.

In this example, at step 501 the block is established as a low precision block, and decoding of the subject instructions starts. At step 502 the first subject instruction is analysed to determine if high precision is required. If high precision is not required, the instruction is added to the block at step 503. The subject instruction added at step 503 is then analysed to determine if it comprises an instruction which ends the block. If it does not end the block the process returns to step 503 and the next instruction is analysed to determine if high precision is required. If at step 505 it is determined that an instruction does end the block, then the block is ended and the entry conditions for the following block are set as low precision entry conditions (step 506).

If at step 502 it is determined that the next instruction requires high precision, e.g. because the instruction relates to loading of 80-bit data, or to a floating point operation on 64-bit data but with the output to be rounded to 80-bit precision, then the values stored in the FPU register stack are up-converted to high precision at step 504. Thereafter at step 507 the block is ended the entry conditions for the following block are set as high precision entry conditions. The instruction which required higher precision forms the first instruction in the following block.

Blocks generated according to the method of FIG. 5 as low precision blocks do not require the IU 16 of the target processor 13 to generate the results of floating point operations in the subject code 17 at the required level of precision.

Figure 11:
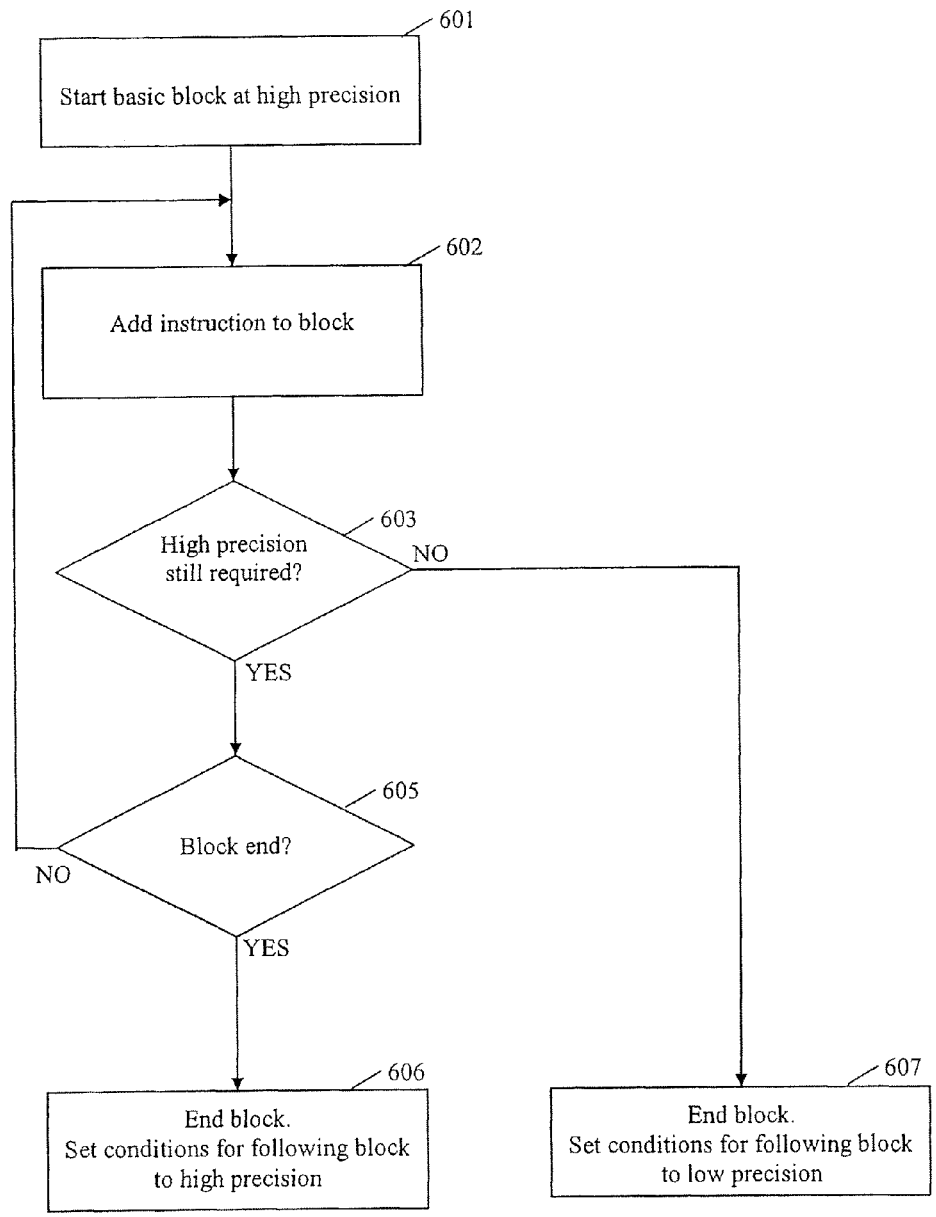
FIG. 11 shows a flow diagram illustrating the steps performed by the floating point status unit, the floating point control unit and the floating point calculation unit in the embodiment of FIG. 3 when generating a basic block which is entered under high precision entry conditions, according to an exemplary embodiment of the present invention.

FIG. 11 shows the steps which are performed when working through a block established under high precision entry conditions. At step 601, the block is established as a high precision block. At step 602 the first subject instruction is added as a high precision instruction. This instruction will result in target code being generated in which the target FPU 14 and IU 16 are used to calculate the result of the floating point operation specified in the subject code. At step 603 the next subject instruction is analysed to determine if high precision is still required. If high precision is still required, the instruction added at step 602 is then analysed to determine if it comprises an instruction which ends the block (step 605). If it does not end the block the process returns to step 602 and the next instruction is added to the block.

If at step 605 it is determined that an instruction does end the block, then the block is ended, and the entry conditions for the following block are set as high precision entry conditions (step 606).

If at step 603 it is determined that the next instruction can be performed at lower precision, e.g. because no high precision data is present in the representation of the subject FPU 27a, e.g. indicated by checking the status of the representation of the subject FPU stack pointer 27b, then the method proceeds to step 607 where the block is ended and the entry conditions for the following block are set as low precision entry conditions. The 64-bit instruction which led to the end of the block forms the first instruction in the following block, the following block being generated according to the method of FIG. 10.

As has been demonstrated by the foregoing description, the various embodiments above provide for the efficient handling of subject program code on a target machine, where the subject code operands or the result of subject code operations require a different precision than provided for by the target machine. Moreover, subject program code instructions involving a higher precision than that supported by the target machine architecture are identified and handled quickly and efficiently when data of different precisions is operated on.

The different structures of the translator unit and method of the present invention are described separately in each of the above embodiments. However, it is the full intention of the inventors of the present invention that the separate aspects of each embodiment described herein may be combined with the other embodiments described herein. Those skilled in the art will appreciate that various adaptations and modifications of the just described preferred embodiments can be configured without departing from the scope and spirit of the invention. Therefore, it is to be understood that, within the scope of the appended claims, the invention may be practiced other than as specifically described herein.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A computing system comprising:
 a processor;
 a floating point unit and an integer unit within said processor;
 a translator unit arranged to receive subject code instructions including at least one instruction relating to a floating point operation, and in response to generate corresponding target code for execution on said processor;
 a floating point status unit within the translator arranged to generate floating point status information according to the received subject code instructions, wherein the translator unit is arranged to maintain, as part of a subject register bank a representation of a subject floating point unit stack referred to by received subject code instructions, and wherein the floating point status unit is arranged to monitor the content of the representation of the subject floating point unit stack to generate floating point status information; and
 a floating point control unit within the translator unit arranged to receive the floating point status information from the floating point status unit, and in response to control the translator unit to generate either: target code for performing the floating point operations on the floating point unit; or target code for performing the floating point operations using a combination of the integer unit and the floating point unit.

2. The computing system of claim 1, wherein the floating point status unit is arranged to generate floating point status information in response to the precision of data referenced in the received subject code instructions.

3. The computing system of claim 1, wherein the received subject code instructions reference a subject floating point unit, and wherein the floating point status unit is arranged to generate floating point status information in response to instructions in the received subject code which provide data to a subject floating point unit.

4. The computing system of claim 3, wherein the floating point status unit is arranged to generate floating point status information in response to instructions in the received subject code which provide data of a specified numerical precision to the subject floating point unit.

5. The computing system of claim 1, wherein the floating point status unit is arranged to generate floating point status information in response to the numerical precision of data provided in the received subject code as source operands for the subject FPU.

6. The computing system of claim 1, wherein the floating point status unit is arranged to generate floating point status information in response to the numerical precision of data loaded from memory into the subject FPU by instructions in the received subject code.

7. The computing system of claim 1, wherein the floating point status unit is arranged to generate floating point status information for the result of floating point operation.

8. The computing system of claim 7, wherein the floating point status unit is arranged to generate a piece of floating point status information for the result of each floating point operation in the received subject code.

9. The computing system of claim 1, wherein the floating point status unit is arranged to generate a piece of floating point status information indicating that at least one piece of high precision data is present in a data structure of the FPU.

10. The computing system of claim 1, wherein the floating point status unit is arranged to generate floating point status information on a per basic block basis.

11. The computing system of claim 1, wherein the floating point status unit is arranged to generate floating point status information indicating the presence of high precision data in the representation of the floating point unit stack, if one or more pieces of high precision data are contained in the representation of the subject floating point unit stack.

12. The computing system of claim 1, wherein the representation of the subject floating point stack comprises a representation of the data locations in the subject floating point unit register stack, and a representation of the subject floating point unit stack pointer.

13. The computing system of claim 11 or 12, wherein the floating point status unit is arranged to generate floating point status information indicative of the numerical precision of data placed in the data locations in the representation of the subject floating point unit register stack in response to the received subject code instructions.

14. The computing system of claim 13, wherein the floating point status unit is arranged to clear previously generated floating point status information when the representation of the subject floating point unit register stack pointer indicates that the data locations in the representation of the subject floating point unit register stack are empty.

15. The computing system of claim 1, wherein the floating point control unit is arranged to identify instructions relating to floating point operations in the received subject code, to check the received floating point status information in response to such instructions, and in response to generate a floating point control signal.

16. The computing system of claim 15, wherein the translator unit further comprises a floating point calculation unit arranged to generate an appropriate intermediate representation for the target code to be generated, according to a control signal received from the floating point control unit, and wherein the intermediate representation is used by the translator to generate the target code.

17. The computing system of claim 16, wherein the floating point control unit is further arranged to identify a precision specified by floating point instructions in the received subject code, and to generate a floating point control signal for the floating point calculation unit.

18. The computing system of claim 1, wherein the subject code is binary program code which is directly executable by a processor.

19. The computing system of claim 1, wherein the target code is binary program code which is directly executable by the processor unit.

20. The computing system of claim 1, wherein the translator unit is arranged to convert the subject code being binary program code which is directly executable by a processor of a first type into the target code being binary program code which is directly executable by the processor unit.

21. The computing system of claim 1, wherein the translator unit is arranged to translate the subject code written for execution by a processor of a first type into the target code executed by the processor unit of a different non-compatible second type.

22. The computing system of claim 1, wherein the processor comprises a PowerPC processor, and wherein the translator unit is arranged to receive subject code instructions written for an x87 processor.

23. The computing system of claim 1, wherein the translator unit is arranged to optimize the subject code written for execution by a processor of a first type into the target code that is executed more efficiently by the processor unit of the same first type.

24. A computing system comprising:
    a processor;
    a floating point unit and an integer unit within said processor;
    a translator unit arranged to receive subject code instructions including at least one instruction relating to a floating point operation, and in response to generate corresponding target code for execution on said processor;
    a floating point status unit within the translator arranged to generate floating point status information according to the received subject code instructions, wherein the translator unit is arranged to maintain, as part of a subject register bank a representation of a subject floating point unit stack referred to by received subject code instructions, and wherein the floating point status unit is arranged to monitor the content of the representation of the subject floating point unit stack to generate floating point status information; and
    a floating point control unit within the translator unit arranged to receive the floating point status information from the floating point status unit, and in response to control the translator unit to generate either: target code for performing the floating point operation directly on the floating point unit; or target code for performing the floating point operation indirectly using one or both of the integer unit and the floating point unit.

25. A decoder unit for use in a dynamic binary translator, the decoder unit comprising:
    a floating point status unit arranged to generate floating point status information according to floating point instructions in subject code instructions received by the decoder unit from a subject computing system, wherein the floating point status unit is arranged to monitor content of a representation of a subject floating point unit stack of the subject computing system as part of a subject register bank referred to by received subject code instructions to generate floating point status information, the floating point status information indicating whether to perform a floating point operation using either a floating point unit of a target computing system or a combination of an integer unit of the target computing system and the floating point unit of the target computing system to output a desired level of numerical precision from the floating point operation; and a floating point control unit arranged to receive the floating point status information from the floating point status unit, and in response to generate a control signal indicating the desired level of numerical precision for the output of the floating point instructions by the target computing system.

26. A method of handling floating point instructions in a target computing system, comprising the computer-implemented steps of:
receiving from a subject computing system subject code instructions including at least one instruction relating to a floating point operation;
maintaining, as part of a subject register bank a representation of a subject floating point unit stack of the subject computing system referred to by received subject code instructions;
monitoring the content of the representation of the subject floating point unit stack to generate floating point status information according to the received subject code instructions; and
in response to the floating point status information generating either: target code for performing the floating point operations on a floating point unit of the target computing system; or target code for performing the floating point operations using a combination of an integer unit of the target computing system and the floating point unit of the target computing system.

27. A method of handling floating point instructions in a target computing system, comprising the computer-implemented steps of:
receiving from a subject computing system subject code instructions including at least one instruction relating to a floating point operation;
maintaining, as part of a subject register bank a representation of a subject floating point unit stack of the subject computing system referred to by received subject code instructions;
monitoring the content of the representation of the subject floating point unit stack to generate floating point status information according to the received subject code instructions; and
in response to the floating point status information generating either: target code for performing the floating point operations directly on a floating point unit of the target computing system; or target code for performing the floating point operations indirectly, using a combination of an integer unit of the target computing system and the floating point unit of the target computing system.

28. A computer readable recording medium having instructions recorded thereon which when executed by a target computing system perform the steps of:
receiving from a subject computing system subject code instructions including at least one instruction relating to a floating point operation;
maintaining, as part of a subject register bank a representation of a subject floating point unit stack of the subject computing system referred to by received subject code instructions;
monitoring the content of the representation of the subject floating point unit stack to generate floating point status information according to the received subject code instructions; and
in response to the floating point status information generating either: target code for performing the floating point operations on a floating point unit of the target computing system; or target code for performing the floating point operations using a combination of an integer unit of the target computing system and the floating point unit of the target computing system.

29. A computer readable recording medium having instructions recorded thereon which when executed by a target computing system perform the steps of:
receiving from a subject computing system subject code instructions including at least one instruction relating to a floating point operation;
maintaining, as part of a subject register bank a representation of a subject floating point unit stack of the subject computing system referred to by received subject code instructions;
monitoring the content of the representation of the subject floating point unit stack to generate floating point status information according to the received subject code instructions; and
in response to the floating point status information generating either: target code for performing the floating point operations directly on a floating point unit of the target computing system; or target code for performing the floating point operations indirectly, using a combination of an integer unit of the target computing system and the floating point unit of the target computing system.

* * * * *